United States Patent
Armaitis et al.

(10) Patent No.: US 11,037,295 B2
(45) Date of Patent: Jun. 15, 2021

(54) METHODS, SYSTEMS AND USE FOR DETECTING IRREGULARITIES IN MEDICAL IMAGES BY MEANS OF A MACHINE LEARNING MODEL

(71) Applicant: OXIPIT, UAB, Vilnius (LT)

(72) Inventors: Jogundas Armaitis, Vilnius (LT);
Darius Barušauskas, Vilnius (LT);
Jonas Bialopetravičius, Vilnius (LT);
Gediminas Pekšys, Vilnius (LT);
Naglis Ramanauskas, Vilnius (LT)

(73) Assignee: OXIPIT, UAB, Vilnius (LT)

( * ) Notice: Subject to any disclaimer, the term of this patent is extended or adjusted under 35 U.S.C. 154(b) by 0 days.

(21) Appl. No.: 16/678,070

(22) Filed: Nov. 8, 2019

(65) Prior Publication Data
US 2020/0151873 A1 May 14, 2020

(30) Foreign Application Priority Data
Nov. 9, 2018 (EP) .................................. 18205307

(51) Int. Cl.
*G06T 7/00* (2017.01)
*G06T 7/11* (2017.01)

(52) U.S. Cl.
CPC .............. *G06T 7/0012* (2013.01); *G06T 7/11* (2017.01); *G06T 2207/20081* (2013.01);
(Continued)

(58) Field of Classification Search
CPC . G06T 2207/10116; G06T 2207/20081; G06T 2207/20084; G06T 2207/30048;
(Continued)

(56) References Cited

U.S. PATENT DOCUMENTS 7,295,691 B2 11/2007 Uppaluri et al.
7,995,815 B2 8/2011 Nekrich et al.
(Continued)

FOREIGN PATENT DOCUMENTS

CN 108389190 A 8/2018
KR 101887194 B1 6/2018
(Continued)

OTHER PUBLICATIONS

Jiang, Feng, et al. "Medical image semantic segmentation based on deep learning." Neural Computing and Applications 29.5 (2018) : 1257-1265. (Year: 2018).*
(Continued)

*Primary Examiner* — Nirav G Patel
(74) *Attorney, Agent, or Firm* — Bonini IP Law, LLC; Frank J. Bonini, Jr.

(57) ABSTRACT

A method for training a computer-implemented machine learning model for detecting irregularities in medical images, the method including: identifying at least one predetermined type of body region (14) depicted in a medical image (10), said body region (14) having a depicted irregularity (12); defining a plurality of image segments (20) each including at least part of the depicted body region (14), wherein a resolution of the image segments (20) is maintained or not reduced by more than 20% compared to the medical image (10); and using said image segments (20) to train a machine learning model to detect similar irregularities (12) in other medical images (10). Further, the invention relates to a use and to systems for training a computer-implemented machine learning model for detecting irregularities in medical images.

15 Claims, 1 Drawing Sheet

(52) U.S. Cl.
CPC ............... *G06T 2207/20084* (2013.01); *G06T 2207/30048* (2013.01); *G06T 2207/30061* (2013.01)

(58) Field of Classification Search
CPC ......... G06T 2207/30061; G06T 7/0012; G06T 7/11
See application file for complete search history.

(56) References Cited

U.S. PATENT DOCUMENTS

| | | | |
|---|---|---|---|
| 9,292,655 | B2 | 3/2016 | Arazi et al. |
| 2005/0033139 | A1* | 2/2005 | Li .................. G06T 7/0012 600/407 |
| 2014/0257854 | A1 | 9/2014 | Becker et al. |
| 2016/0015347 | A1 | 1/2016 | Bregman-Amitai et al. |
| 2017/0148156 | A1 | 5/2017 | Bregman-Amitai et al. |
| 2018/0075628 | A1 | 3/2018 | Teare |
| 2018/0240235 | A1 | 8/2018 | Mazo |
| 2020/0074271 | A1* | 3/2020 | Liang .................... G06N 3/084 |

FOREIGN PATENT DOCUMENTS

| | | |
|---|---|---|
| WO | 2008052283 A1 | 5/2008 |
| WO | 2017010612 A1 | 1/2017 |
| WO | 2017189758 A1 | 11/2017 |
| WO | 2018094438 A1 | 5/2018 |

OTHER PUBLICATIONS

Feng, Xinyang, et al. "Discriminative localization in CNNs for weakly-supervised segmentation of pulmonary nodules." International conference on medical image computing and computer-assisted intervention. Springer, Cham, 2017. (Year: 2017).*

Ronneberger et al. in "U-Net: Convolutional Networks for Biomedical Image Segmentation", Medical Image Computing and Computer-Assisted Intervention (MICCAI), Springer, LNCS, vol. 9351: 234-241, 2015.

Wang C. (2017): "Segmentation of Multiple Structures in Chest Radiographs Using Multi-task Fully Convolutional Networks". In: Sharma P., Bianchi F. (eds) Image Analysis. SCIA 2017. Lecture Notes in Computer Science, vol. 10270. Springer, Cham.

Kaur S., Hooda R., Mittal A., Akashdeep, Sofat S. (2017) Deep CNN-Based Method for Segmenting Lung Fields in Digital Chest Radiographs. In: Singh D., Raman B., Luhach A., Lingras P. (eds) Advanced Informatics for Computing Research. ICAICR 2017. Communications in Computer and Information Science, vol. 712. Springer, Singapore.

Wei Dai et al. in "SCAN: Structure Correcting Adversarial Network for Organ Segmentation in Chest X-rays", ICCV 2017, retrievable via https://arxiv.org/pdf/1703.08770.pdf.

Wei Liu et al. "SSD: Single Shot MultiBox Detector" retrievable via https://arxiv.org/pdf/1512.02325.pdf.

Ren et al. "Faster R-CNN: Towards Real-Time Object Detection with Region Proposal Networks" retrievable via https://arxiv.org/pdf/1506.01497.pdf.

Ivo M Baltruschat et al: "When does Bone Suppression and Lung Field Segmentation Improve Chest X-Ray Disease Classification?"; arxiv.org, Cornell University Library, 201 Olin Library Cornell University, Ithaca, NY 14853.

Qiangguo Jin et al: "RA-UNET: A hybrid deep attention-aware network to extract liver and tumor in CT scans", arxiv.org, Cornell University Library, 201 Olin Library Cornell University, Ithaca, NY 14853.

Bilic et al. (2019): The Liver Tumor Segmentation Benchmark (LiTS).

* cited by examiner

METHODS, SYSTEMS AND USE FOR DETECTING IRREGULARITIES IN MEDICAL IMAGES BY MEANS OF A MACHINE LEARNING MODEL

BACKGROUND OF THE INVENTION

1. Field of the Invention

The invention relates to methods, systems and a use for detecting irregularities in medical images by means of a machine learning model. Specifically, the invention relates to the field of medical image processing and medical image evaluation by means of artificial intelligence in form of a computer-implemented machine learning models.

2. Brief Description of the Related Art

Medical images can be retrieved by known medical imaging apparatuses, such as x-ray, ultrasonic, CT- or MRT-apparatuses. The images or image data can be two- or three-dimensional (i.e. a location of the pixels of an image can be defined in a two- or three-dimensional pixel coordinate system). For performing a diagnostic analysis of such medical images, a high level of knowledge and experience is required by the medical staff, such as by a radiologist. Radiologists often only have a limited time for analyzing a medical image and their analysis can still be prone to errors.

Therefore, attempts have been made to develop computer-implemented solutions which support the analysis of medical images.

For example, in WO 2018/094438 a lookup database is described for identifying medical images that are similar to a currently captured medical image. With help of a neural network a so-called feature vector is assigned to the currently captured medical image and said feature-vector is compared to feature vectors of the images in a lookup database. Using feature vectors, however, includes various simplifications so that not all of the information contained in a medical image will actually be considered.

SUMMARY OF THE INVENTION

It is an object of the invention to improve the accuracy of a computer-implemented analysis of medical images.

This object is solved by the methods, the systems and the use disclosed and described herein, which include advantageous embodiments. Moreover, the features mentioned in the introductory part of the description may individually or in any combination thereof also be provided in the presently disclosed solution, if not mentioned or evident otherwise.

According to a general idea of the invention, a machine learning model, such as an artificial neural network, can be used to directly detect irregularities in a medical image. Preferably, no intermediate generation of feature vectors is necessary, in the process of which information can already be lost. The irregularities are preferably medical or medical irregularities of the depicted body region and not irregularities resulting from the image taking procedure, such as hardware-caused irregularities due to malfunctions of the imaging apparatus. An irregularity may generally indicate an unhealthy state.

Moreover, in order to achieve a high accuracy, the neural network is trained based on highly informative data without negatively affecting the required training time and the number of training images that are necessary to achieve a desired accuracy. Specifically, the invention suggests using non-compressed or only slightly compressed image segments which only include a limited amount of irrelevant information or no irrelevant information at all.

In the context of this disclosure, the accuracy may relate to the detection accuracy of the neural network with regard to detecting irregularities. Relevant information may be information which needs to be analyzed for detecting the irregularity and/or which relates to areas of an image which may potentially comprise the irregularity. Irrelevant information may be information which does not need to be analyzed for detecting the irregularity and/or which relates to areas of an image which are not likely to comprise the irregularity.

The invention is based on the observation that medical images and in particular x-ray-images can have a considerable size. For example, a size of 4096×4096 pixels is common for such images. Only a portion of said images, however, includes actually relevant information, such as a body region of interest which should be checked for irregularities.

Note, however, that the invention is not limited to x-rays, but may be applied to any e.g. two- or three-dimensional medical image derived by any of the above mentioned imaging apparatuses (ultrasonic, CT, MRT). Also, the medical images may contain more than the body region of interest by depicting a whole body part or body segment, such as the chest, head or abdomen.

In order to achieve a satisfying detection accuracy, the machine learning model needs to be trained. The training typically takes place when developing the model and before roll out of a software product including said model to a customer. The training is a time-consuming process which may include numerous iterations. If no satisfying accuracy is achieved, a new training dataset has to be looked for and/or the training has to be started again.

The inventors have discovered that using fully sized medical images with a maximum resolution may increase the training time and/or image number that is necessary until a satisfying accuracy is achieved. This is because the neural network is faced with a lot of irrelevant information within said images. Differently put, it will take more time and possibly also more training images to train the neural network so that it can differentiate between irrelevant and relevant information and actually detect irregularities.

On the other hand, compressing the resolution of an image so that it can be analyzed quicker may lead to losing information in the actual regions of interest. This can lead to a reduced accuracy of the model as well. However, compressing image resolution is common in the present technical field. For example, medical applications often rely on established solutions which are inefficient in terms of processing large images, thus causing a need for image compressions.

The invention overcomes such issues by, during the training stage of the model, identifying actual body regions of interest within the medical images. These body regions are then segmented without, however, their resolution being significantly compressed. Preferably, the resolution is even maintained. Afterwards, these comparatively small image segments, which mostly include potential regions of interest in a non- or only slightly compressed format, are used to train the machine learning model.

The machine learning model is thus faced with less irrelevant information, because the image segments focus on the body region of interest. This can help to reduce the time and the number of images or image segments which are necessary to achieve a desired accuracy. Moreover, the image segments include non- or only slightly compressed information. This helps to improve the accuracy because the machine learning model is then trained to detect the irregularity even more exactly (e.g. even in terms of exact size and/or shape).

Still further, by segmenting the medical image, more individual datasets (i.e. image segments) can be generated based on which the model can be trained. This is beneficial as the availability of useful medical images for training purposes might be limited.

In more detail, a method for training a computer-implemented machine learning model for detecting irregularities in medical images is suggested, the method including:

identifying at least one predetermined type of body region depicted in a medical image, said body region having a depicted (medical or biological) irregularity (e.g. of a defined type);

defining a plurality of image segments each including (or, in other words, each depicting) at least part of the body region, wherein a resolution of the image segments is maintained or not reduced by more than 20% compared to the medical image; and using said image segments to train a machine learning model to detect the similar irregularities (e.g. irregularities of said defined type) in other medical images.

The medical images used for the training of the machine learning model may also be referred to as training medical images. These might be available from image databases. The training medical images represent a ground truth dataset for training the machine learning model. Specifically, whether or not the irregularity is present in said images and possibly further characteristics of said irregularity, such as its size and position, may have already been validated in advance. Such information may be stored in a respective medical image dataset. In other words, the machine learning model is fed with the datasets whose contents especially with regard to the irregularity are already known and validated. Using ground truth datasets is a known concept in the field of training machine learning models.

After the machine learning model has been trained, new medical images can be received which are yet to be analyzed or, differently put, yet to be processed by the machine learning model. Specifically, in these new medical images, it may not be known whether an irregularity is present (i.e. this may not be stored as an information within the image dataset). Instead, the machine learning model is supposed to automatically detect such irregularities. Accordingly, the new medical images may also be referred to as diagnosis medical images since the irregularity has yet to be detected (i.e. diagnosed) therein.

The machine learning model may be computer-implemented and/or may be executable by means of a computer device. For doing so, the computer device may comprise at least one processing unit, such as a microcontroller. The machine learning model may be defined by programming instructions e.g. included in a computer program product that is executed by the computer device.

The machine learning model may be any model that is configured to, after having carried out a machine learning process, automatically (i.e. without any further manual input) analyze input data with regard to a desired aspect. In the present case, the analysis of the input data is directed to detecting the irregularity. For example, the machine learning model may be an input-output-model for generating outputs based on input data, wherein the connection (or, differently put, relation) between the input data and the output is defined within and by the model. In general, the machine learning model may express a non-linear relation between input and output data, wherein the type of said relation (e.g. in a quantified and/or weighted manner) is identified during the machine learning process.

A machine learning process may in the context of this disclosure be equivalent to and/or include the training of the machine learning model.

A relation between input data and output data may be expressed by and/or be encoded in the machine learning model by means of at least one mathematical function (i.e. the model being defined as, including or describing said function). During the machine learning process, specifics of said mathematical function, such as parameter values or weights, may be determined.

The machine learning process may be a so-called deep learning or hierarchical learning process, wherein it is assumed that numerous layers or stages exist according to which input parameters impact output parameters. As part of the machine learning process, links or connections between said layers or stages as well as their significance (i.e. weights) can be identified.

Further, the machine learning model may be a deep machine learning model including numerous intermediate layers or stages. Note that these layers or stages may also be referred to as hidden layers or stages, which connect an input layer to an output layer of the model, in particular to perform a non-linear input data processing. During a machine learning process, the relations or links between such layers and stages can be learned and in particular trained and/or tested according to known standard procedures.

In general, for generating the machine learning model a supervised machine learning task may be performed and/or a supervised regression model may be developed.

The machine learning model may be a regression model. Alternatively, the machine learning model may be a support vector machine/bag-of-words model. According to a preferred embodiment, the machine learning model is a neural network.

The irregularity is a (medical or biological) irregularity of a predetermined type. The type of irregularity may e.g. be a certain pathology, a certain symptomatic structure, a certain type of tissue change, or a certain type of dysplasia or deformities, all of which may stem from diseases or general medical malfunctions or abnormality. For example, the irregularity may be a tumor or nodule, such as a lung nodule, or another abnormal (soft) tissue change.

The body region may be or comprise an organ or a group of organs. As discussed in the following, the body region may in particular be the lungs, a left and/or right lung, the heart or may comprise a region in which the heart overlaps with at least one lung. Any medical image may be an X-ray image.

For identifying the body region, known image processing algorithms may be used. This may be based on pattern matching or, preferably, based on machine learning models, such as a neural network. Especially in but not limited to the latter context, identification of a predetermined body region may also be referred to as segmenting the medical image with regard to said body region. More specifically, this may include marking all pixels of the medical image as either belonging to said body region or not (e.g. by means of respective data labels).

As an example, medical image segmentation by a so-called Unet is referred to. This has been originally proposed by Ronneberger et al. in "U-Net: Convolutional Networks for Biomedical Image Segmentation", Medical Image Computing and Computer-Assisted Intervention (MICCAI), Springer, LNCS, Vol. 9351: 234-241, 2015.

Solutions for using a Unet for heart and lung segmentation in medical images are described in Wang C. (2017): "Segmentation of Multiple Structures in Chest Radiographs Using Multi-task Fully Convolutional Networks". In: Sharma P., Bianchi F. (eds) Image Analysis. SCIA 2017. Lecture Notes in Computer Science, vol 10270. Springer, Cham.

However, using Unets is not mandatory for e.g. lung segmentation from chest-X-rays as shown in Kaur S., Hooda R., Mittal A., Akashdeep, Sofat S. (2017) Deep CNN-Based Method for Segmenting Lung Fields in Digital Chest Radiographs. In: Singh D., Raman B., Luhach A., Lingras P. (eds) Advanced Informatics for Computing Research. ICAICR 2017. Communications in Computer and Information Science, vol 712. Springer, Singapore. A further non-Unet based approach is described by Wei Dai et al. in "SCAN: Structure Correcting Adversarial Network for Organ Segmentation in Chest X-rays", ICCV 2017, retrievable via https://arxiv.org/pdf/1703.08770.pdf.

Further background can be found in the following publications: Wei Liu et al. "SSD: Single Shot MultiBox Detector" retrievable via https://arxiv.org/pdf/1512.02325.pdf and Ren et al. "Faster R-CNN: Towards Real-Time Object Detection with Region Proposal Networks" retrievable via https://arxiv.org/pdf/1506.01497.pdf.

Especially these two latter publications include a discussion on how a machine learning model is trained based on training images.

References to images or image segments "containing", "including" or "covering" certain body parts or body regions are to be understood in the context of image processing. In other words, this means that the images or image segments contain visualizations or, more generally, image information depicting the respective body parts or body regions, but not that the images or image segments contain, include or cover said body parts or body regions in a physical sense.

The image segments have a size that is smaller than the medical image and e.g. cover an area of less than 50%, less than 30% or less than 10% of the medical image. The image segments may have similar or varying sizes and/or shapes when compared to one another. At least two image segments may be used for covering the body region. Preferably, at least four or at least six image segments are used for covering the body region. Also, at least portions of two or more of the image segments may cover different areas of the medical image. As discussed below, at least portions of at least two of the image segments may overlap one another.

In the context of this disclosure, including or covering a body region or area of a medical image by means of an image segment may express that the image segment contains a part of said medical image or of its original or processed image information (i.e. image data) depicting the respective body region or area of the medical image. As discussed below, this may include transferring or copying image information of the medical image into an image segment dataset.

In more details, the image segments may be defined as datasets containing a subset of the original image data of the medical image. For example, they may contain the pixel information (i.e. pixel values) belonging to an area of the medical image that is covered by the respective image segment. The medical image and/or its dataset may as such continue to exist. Accordingly, the image segments may be defined as additional datasets based on the original medical image and contain parts of the medical image's image information as discussed above, e.g. by copying said image information into a respective image segment dataset.

The invention may further include determining at least one dimension of the identified body region and defining the image segments as a function of said dimension, e.g. by defining their size accordingly. For example, a length and/or width of the identified body region may be determined and a corresponding length and/or width of the image segments may be selected accordingly. For example, a length and/or width of the image segments may correspond to a predetermined share of the length and/or width of the identified body region, such as one half, one third or one quarter thereof. The length and width may be measured along different axes of a pixel coordinate system.

The resolution may be defined as based on the number of different pixels within the medical image and/or within an image segment. It is considered to either maintain the resolution of the image segments compared to the medical image (i.e. not compressing them) or reducing it by not more than 20% or alternatively not more than 10% or not more than 5% (i.e. only slightly compressing it). It has been found that such slight compressions may still lead to improvements, whereas the above discussed advantages of the invention are particularly well achieved when not reducing the resolution at all.

For training the machine learning model, any procedure known in the present technical field may be applied. Examples can be found in the above referenced scientific publications (see especially last two cited publications). The present invention is not directed to how the training is performed but rather, which data are used as a basis for the training.

It is preferred that only the image segments described herein are used to train the computer model and not the original medical image as a whole. Also, it is preferred if no image segments other than the ones defined according to the invention (e.g. with little or no compression) are used for training the machine learning model.

After training has been performed, the invention may include using the trained neural network to detect an irregularity in at least one further medical image. Said further medical image may be a diagnosis medical image as described above. Due to using the image segments defined herein for training the model, a higher accuracy with regard to detecting the irregularity can be achieved.

Note that in a preferred embodiment, the machine learning model is not only trained based on medical images containing the irregularity, but also based on images being free of a respective irregularity. This way, the machine learning model can be efficiently trained to differentiate between healthy (regular) and unhealthy (irregular) body regions.

In this context, both of the regular (healthy) and irregular (unhealthy) images may be segmented in the manner described herein. Also, any segment may be provided with information (e.g. in form of a data label), defining said segment as being either healthy or unhealthy. In the latter case, said information may e.g. define an area including the irregularity (i.e. its position and/or size). This may include defining a bounding box or other bounding outline around the irregularity e.g. in pixel coordinates. In case of a healthy image, the respective data label may be non-existent or empty. The machine learning model can thus be provided with information indicating whether or not it is faced with a healthy or unhealthy segment.

Note that using such labels may also be used when only considering unhealthy images, e.g. to mark those segments that include the irregularity.

According to one embodiment of the invention, the machine learning model comprises a (artificial) neural network. The neural network may have input and output layers preferably with hidden layers in between (i.e. may be a deep learning neural network). At the input layer, the medical image may be provided and at the output layer, the detected irregularity may be issued. Differently put, the neural network may use the image information of medical images, such as of (diagnosis) medical images which are yet to be analyzed, at an input layer and/or may provide the detected irregularity at an output layer.

For performing the detection, the neural network (but also the general machine learning model) may not refer to any external databases or read in any further information other than information belonging to or stemming from the medical image. In other words, the machine learning model may act as a black box which does not refer to any further databases when performing a detection. It is thus preferred if no reference is made by the machine learning model to databases containing image-related information apart from the current image to be analyzed, such as lookup databases including other images or containing feature vectors describing other images that might be similar to a currently analyzed medical image. Rather, the machine learning model may receive the image to be analyzed as a sole input (or at least as the sole input comprising image information). Based thereon, it may then output the detected irregularity.

According to a further aspect, the invention may include discarding or replacing at least part of the image information of the medical image which do not depict the identified body region. This may be done preferably before segmenting the image, such that the image segments do not contain discarded or replaced parts of the medical image. In general, this aspect serves to delete or limit the impact of irrelevant information within the medical image. For example, the identified body region may be cropped from the medical image, e.g. by defining a respective new image dataset which only includes said body region or by deleting no longer needed image information from the original medical image dataset.

In the context of this disclosure, the image information may be or comprise the data of the medical image, such as its pixel values (e.g. the gray or RGB-values of its pixels).

Alternatively, a dataset may be generated in which only the original pixel values which belong to the identified body region are maintained and the original pixel values of the further body regions are replaced (i.e. overwritten). For example, said pixel values may be overwritten with a constant value for all pixels (e.g. a value corresponding to the color black). Alternatively, said pixel values may be overwritten with random values or variable values according to a predetermined noise pattern.

Replacing no longer needed image information reduces a potentially disturbing impact of (in the context of detecting irregularities within said body region) irrelevant image areas during training of the model.

As noted above, at least two image segments may at least partially overlap one another. It is preferred that no image segments overlap one another completely as this would not result in any different image segment contents based on which the model can be trained. However, by overlapping image segments and in particular only a part of the image segments, it may be possible to increase the number of different image segments which cover the body region and thereby increase the number of image segments having different contents based on which the model can be trained. Typically, the training accuracy of a machine learning model is improved when the number of input datasets with different contents is increased.

Note that the "contents" of an image or image segments may relate to image information of said image or image segments. Also, different contents may be achieved by different (local) distribution of image information within an image segment, even though the image segments may depict similar body regions but may be shifted relative thereto. The distribution of image information within an image segment may be defined with respect to a coordinate system of the image segments, such as a pixel coordinate system.

In general a position and/or size of the irregularity within the (training) medical image may be known. For example, a pixel area including the irregularity may be marked up or labelled and this information may be included in or provided alongside the medical image dataset. Therefore, defining the image segments (i.e. defining their respective positions and/or sizes) may generally be performed depending on the irregularity and in particular depending on its position and/or size.

For example, it is preferred that an optional overlapping portion of the image segments includes at least part of the depicted irregularity. This way, more different image segments (i.e. image datasets) including at least part of the irregularity can be generated, thereby increasing the amount of information that is available for training.

Also, it is preferred that the image segments are defined so that the depicted irregularity is included in at least one image segment and in particular in at least one image segment as a whole. It may also be considered to not define any image segments containing only part of the irregularity, i.e. said irregularity not being split up between different segments. Thus, the machine learning model can be faced with the actual shape and extent of the irregularity during training, thereby increasing the chances that such shapes and extents will also be recognized in future (diagnosis) medical images.

As previously noted, the body region may be the lungs (German: Lunge). The lungs are made up of a left lung and a right lung (German: Lungenflügel). For depicting the lungs, the medical image may cover the chest area of a patient and, in particular, may be a chest X-ray image.

In this context, it is preferred that each left and right lung is segmented by means of at least two image segments. This, again, is a way of increasing the number of image segments and thus the number of datasets based on which the machine learning model can be trained.

Preferably, an image segment does not include more than one lung (i.e. either the right or the left lung). This may help to avoid that the space between the left and right lung, which may not include any relevant information with respect to the detection task, is not or only to a limited degree included in the image segments. This limits the amount of irrelevant information during training of the machine learning model.

According to a further embodiment, at least one further depicted body region is identified in the medical image, at least one further image segment is defined that includes said further depicted body region and said further image segment is also used for training the machine learning model. The further body region may have at least one non-overlapping and/or at least one overlapping part with respect to the first body region described above. It may, however, also be possible that the (typically smaller) further body region fully overlaps with the (typically larger) first body region. By considering further body regions, the detection capability of the neural network can be improved within and/or be extended to such body regions accordingly.

In case of an overlap of the different body regions, the number of image segments depicting said overlapping area may be increased, thereby increasing the accuracy of the neural network with regard to detecting irregularities in such overlapping areas.

In one example, the further depicted body region is the heart or a region in which the heart overlaps with the lungs. It has been found that detecting lung irregularities is particularly difficult in areas in which the heart and lung overlap one another. Therefore, this example contemplates to generate additional image segments particularly for said overlapping area or, alternatively, for the heart which will automatically include image segments which overlap with image segments of the lung. For doing so, an additional segmentation algorithm as described in one of the above cited scientific publications can be used which is specifically directed at segmenting the heart or a respective overlapping area from a medical image.

The invention also relates to the use of a machine learning model (in particular a neural network) for detecting a (medical or biological) irregularity in a medical image, wherein the machine learning model has been trained by means of a method according to one of previous aspects.

Further, the invention relates to a system for training a machine learning model (in particular a neural network) for detecting irregularities in medical images, the system including at least one computer device and being configured to:

identify at least one predetermined type of body region depicted in a medical image, said body region having a known and depicted irregularity (e.g. of a defined type);

define a plurality of different image segments each including at least part of the depicted body region, wherein a resolution of the image segments is not changed or not reduced by more than 20% compared to the medical image; and use said image segments to train a machine learning model to detect similar irregularities in other medical images.

Any or all of the above steps and functions may be carried out by means of the computer device or by a network of computer devices comprised by the system. For doing so, the computer device(s) may be configured according to any of the above examples and e.g. execute one or more computer algorithms and/or computer program products for performing the respective steps and functions.

The system may further be configured to use and/or execute the machine learning model/neural network (or a computer program product comprising the neural network) to detect irregularities in a medical image.

Finally, the invention also relates to a system for detecting irregularities in medical images, the system including at least one computer device, the computer device being configured to detect irregularities in medical images by means of a machine learning model that has been trained by means of a method according to one of the previous aspects.

The systems may comprise any further feature, any development or any further aspect in order to provide any of the previously and subsequently discussed steps, interactions, operating states and functions. Specifically, any of the previous and subsequent explanations and developments regarding the method-features may also apply to the corresponding system-features. In general, the systems may be configured to carry out a method according to any of the previous and subsequent aspects.

DETAILED DESCRIPTION OF THE INVENTION

In the following, an embodiment of the invention will be described with reference to the attached schematic figures. Features which correspond to one another with regard to their type and/or function may be assigned the same reference signs throughout the figures.

Figure 1:
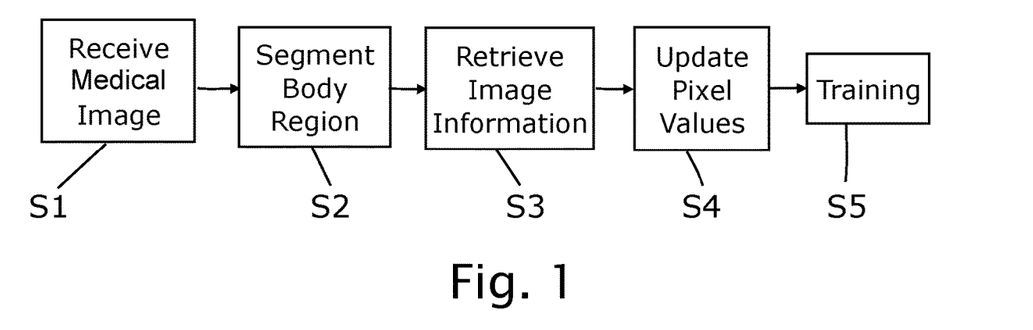
FIG. 1 shows a flow diagram of a method according to an embodiment of the invention.
Figure 2A:
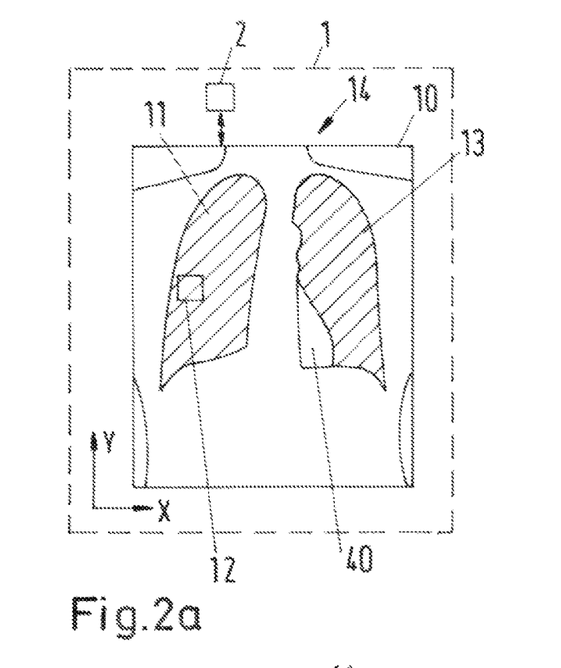
FIG. 2a-d show examples of images and image segments during the different stages of the method according to FIG. 1.

FIG. 1 is a flow diagram of a method according to an example of the invention. Said method is carried out by means of a system 1 comprising a computer device 2, such as a personal computer, as indicated in FIG. 2a.

In the following, the steps S1-S5 of the method indicated in FIG. 1 will be discussed with reference to FIGS. 2a-d which depict relevant images and image segments during the different steps. Specifically, FIG. 2a relates to step S1, FIG. 2b relates to step S2 and FIG. 2c relates to step S3.

In step S1, a medical image 10 in form of a chest X-ray image is received by the computer 2 of the system 1. This medical image 10 is taken from a database of already evaluated chest-X-ray images. More precisely, said database includes a ground truth dataset for the training a machine learning model. Many or even all medical images 10 of said dataset depict an irregularity of a known and predetermined type, such as a lung nodule. The term "known" means in this context that apart from the type, the size and/or position of said irregularity is known and, for example, marked up within the medical image and/or stored as an additional information alongside or within the medical image dataset.

It is to be understood, that as a general aspect of this disclosure and in particular of the shown example, the medical images 10 are provided in digital form and e.g. made up of several pixels, each having a pixel value which e.g. marks an intensity, gray value and/or colour of said pixel. In the case of common X-ray images, each pixel is marked by a gray value.

Due to being a chest-X-ray-image, the medical image 10 depicts the lungs 14 which are made up of the left and right lungs 11, 13. As common in chest-X-ray-images, further body regions are also included, such as part of the neck and shoulder portion as well as part of the abdomen. Also, bone structures such as the rib cage may be visible and overlap with the lungs 14.

An irregularity 12 in form of a lung nodule is marked up within the image 10 and indicated by a box in FIG. 2a. The box has a size of e.g. 100 pixels×100 pixels and may generally (i.e. not only within the context of this embodiment) cover an area of less than 10% or less than 5% of the total image area. On a data level, the box is defined by the coordinates of the pixels included in said box. These coordinates represent the position and size of the irregularity 12 and have been determined in advance by e.g. manually analyzing the medical image 10. Additionally or alternatively, the pixels within the box may be labelled or otherwise marked up e.g. by including a respective data label alongside their pixel values. Accordingly, those pixels which depict the irregularity 12 can be read out by a respective data label search request performed on all of the pixels within an image dataset of the medical image 10.

Figure 2B:
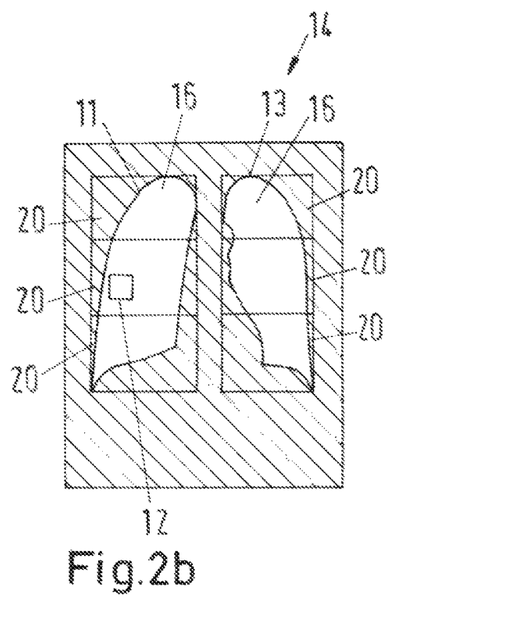

In a second step S2, the body region of interest is segmented from the original medical image 10. In the present case, this predetermined body region of interest is or includes the lungs 14 in which the machine learning model is later supposed to automatically detect irregularities 12.

Segmenting the lungs 14 from the original medical image 10 is performed by one of the prior art techniques discussed above, such as by means of a Unet. The Unet labels all pixels belonging to or, differently put, depicting the lungs 14 within the image dataset as lung pixels. This may also include differentiating between left- and right-lung pixels. Also, the Unet may label all pixels not belonging to or not depicting the lungs 14 as respective non-lung-pixels.

Based on these labels, an image as depicted in FIG. 2b is arrived at. In said figure, the lung-pixels are white and define empty areas 16 corresponding to the left and right lungs 11, 13, whereas the non-lung-pixels are black and depicted as a hatched area surrounding the empty areas 16.

By doing so, the non-lung-pixels can either be discarded or displaced (i.e. overwritten) with predetermined information which is less prone to negatively affect the training or, differently put, will pose less challenges for the machine learning model with respect to actually detecting the specific type of irregularity 12. As noted above, black color or noise can be used as a respective displacement.

In step S3, the lung-pixels of FIG. 2b are used as a mask to retrieve the image information (i.e. pixel values) of said lung pixels from the original medical image 10, wherein said information correspond to and depict the lungs 14. The result is depicted in FIG. 2c.

Coming back to FIG. 2b, an image segmentation of the lungs 14 is indicated. Within the area containing the lungs 14, box-shaped image segments 20 are shown. More specifically, six image segments 20 are shown, the number, size and shape of which is only by way of example, but represents a preferred choice.

In the present case, each of the left and right lungs 11, 13 are segmented by three image segments 20. The image segments 20 are sized and shaped so that they only include one of the left or right lungs 11, 13, but e.g. not much of the space in between. Since only the image segments 20 will be used for training the machine learning model later on, leaving out a large share of the space between the left and right lungs 11, 13 limits the amount of irrelevant information included in the overall training dataset.

Figure 2C:
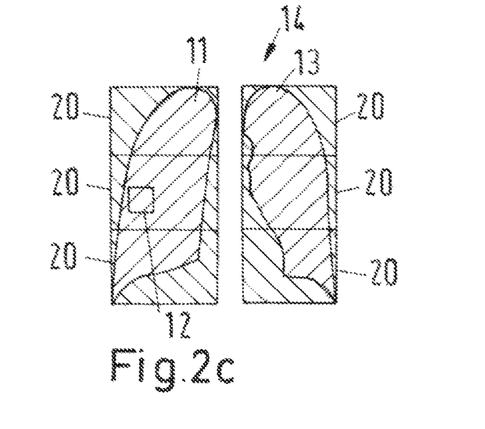

Note that contrary to what is depicted in FIGS. 2b and 2c, the image segments 20 could also be defined so as to exactly conform to the outline of the left and right lungs 11, 13 shown in FIG. 2b. In consequence, the image segments 20 would not include any of hatched portions.

On the other hand, including anatomical regions outside (i.e. next to) the lungs can be of interest to detect irregularities in said areas as well. For example, this way air trapped under the skin could be detected (subcutaneous emphysema). Accordingly, the body region may not only include the lungs 11, 13, but also respective areas surrounding it. In one general example which is not limited to the context of this embodiment, the body region includes the lungs 11, 13, the pleura and further soft tissue adjacent the pleura. For example, up to 5 cm or 10 cm of further tissue may be included (e.g. measured as the thickness of said tissue).

For defining the image segments 20, the outcome of step S2, according to which each of the lung-pixels are known, can be used to determine a position and dimension of the left and right lungs 11, 13 within a pixel coordinate system. For the two-dimensional case, a respective coordinate system is indicated in FIG. 2a, wherein Y corresponds to a length axis and X to a width axis. Thus, a length and width of each of the left and right lungs 11, 13 can be determined and a width and length of the image segments 20 (as well as a position thereof) can be defined accordingly.

Even though this is not specifically shown in FIG. 2b, two image segments 20, for example the two lower ones covering the left lung 11, may also overlap one another. Specifically, they may overlap one another to such a degree, that both include the irregularity 12. On the other hand, they may include at least one portion which does not overlap with the respective other segment 20 (i.e. not be fully congruent). Also, it is generally preferred to choose the boundary between the image segments 20 in such a manner, that the irregularity 12 is not split between two segments, i.e., only included as a whole within one or even all of the image segments 20.

In step S4, the contents of the image segments are updated by filling in the pixel values of the original medical image 10 according to the above-mentioned masking-procedure. Note that it would also be possible to use the mask of FIG. 2b to first fill in the original pixel values as shown in FIG. 2c and to only afterwards define the image segments 20.

The result is shown in FIG. 2c. It can be seen that compared to the size of the original medical image 10 of FIG. 2a, the combined size of the image segments 20 has been reduced. This is the result of identifying the actual body region of interest (in the present case the lungs 14) and deleting (or at least not considering) a large area of the original medical image 10 by not including said area in the image segments 20.

Note that in FIG. 2c, the original image date (pixel values) of lungs 11, 13 are marked by hatchings corresponding to those of FIG. 2a. The deleted image information outside the lungs 11, 13, to the contrary, are marked by hatchings corresponding to FIG. 2b.

A further advantageous feature of the shown example results from the fact that original image data are contained in the final image segments 20 of FIG. 2c and, more precisely, the original image information at the lung-pixels depicting the lungs 14 are maintained. Specifically, the resolution of said image data is maintained and not compressed in order to maintain as much original image information for training the machine learning model as possible.

Figure 2D:
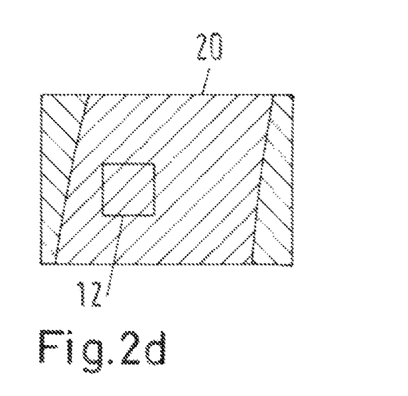

As shown in FIG. 2d, a resulting image segment 20 which in this case includes the irregularity 12 is made up of only a small share of less relevant non-lung-pixels, but comprises a large share of relevant lung-pixels. The latter, moreover, are maintained in the original-non-compressed form. Also, due to the segmentation, six image segments 20 can each be used as an individual dataset for training the machine learning model. Thus, instead of one large dataset in form of the original medical image 10, six smaller ones in form of the image segments 20 with highly relevant and highly resolved information can be used for training the machine learning model.

It is to be noted that all of the above steps are performed by the computer 2 and all of the resulting image data and datasets are stored on a storage medium of the computer 2. Moreover, training of the machine learning model is also performed by the computer 2 and said model is stored as an exportable software program or computer program product on the computer 2.

The training takes place in step S5. It can be performed according to known methods and will thus not further be elaborated upon. In the shown example, the machine learning model is a neural network that is trained based on the image segments 20.

It should be noted that, in order to achieve a sufficient accuracy, a large number of different original medical images 10 should be provided and segmented according to the discussed method. As an example, at least 100 different original medical images 10 should be provided.

After training has been completed, medical images 10 which do not belong to the ground truth dataset and have not yet been fully analyzed by a radiologist can be captured and the machine learning model can be used to automatically detect an irregularity 12 in form of a lung nodule therein. This can be used to direct the radiologist's attention to a respective irregularity, for example, by providing a respective notification in text form or by marking up the irregularity in the chest x-ray-image on a computer screen.

Coming back to FIG. 2a, as a further body region 40 the heart is shown. The heart typically overlaps with at least part of the lungs 14. This overlapping area is displayed in an X-ray-image differently compared to other areas of the lungs 14. Typically, said overlapping area is brighter. Accordingly, in case an irregularity 12 is positioned in said overlapping area, detecting said irregularity 12 may be more difficult or at least require different capabilities of a machine learning model compared to other areas of the lungs 14.

Accordingly, the shown example also contemplates defining one or more further image segment(s) 20 that is/are not specifically depicted in FIGS. 2a-d and that include(s) said overlapping portion of the heart and lungs 14. The further image segment(s) is/are used in addition to all the other image segments 20 for training the machine learning model.

In the above example, the lungs 11, 13 have been referred to as "left" and "right" with respect to the figures (i.e. the image plane). It should be noted that from an anatomical point of view, the opposite would also be possible (i.e. the lung 13 close to the heart 40 being the left lung and the other lung 11 being the right lung).

Note that the machine learning model could, according to the present invention, also be trained exclusively based on image segments depicting said overlapping portion of the heart and lungs 14. The machine learning model would then be specialized in detecting irregularities 12 in said overlapping portion only. Alternatively, the machine learning model could also be trained exclusively based on image segments depicting the heart in order to detect irregularities 12 of said heart.

Finally, the machine learning model could, in addition to unhealthy images, also be trained based on healthy (i.e. regular) medical images that do not include any irregularities. The above method could thus also be applied for segmenting healthy images. In consequence, the machine learning model could be provided with image segments stemming from both healthy and unhealthy images, thus being trained to better differentiate between these states. Healthy and unhealthy segments could be marked and identified with help of data labels discussed in the general part of this description (e.g. with help of bounding boxes enclosing irregularities).

The invention claimed is:

1. A method for training a computer-implemented machine learning model for detecting irregularities in medical images, the method including:

identifying at least one predetermined type of body region (14) depicted in a medical image (10), said body region (14) having a depicted irregularity (12);

defining a plurality of image segments (20) each including at least part of the depicted body region (14), wherein a resolution of the image segments (20) is maintained or not reduced by more than 20% compared to the medical image (10); and using said image segments (20) to train a machine learning model to detect similar irregularities (12) in other medical images (10);

wherein the machine learning model comprises a neural network; wherein the neural network uses the image information of medical images (10) at an input layer and/or provides the detected irregularity at an output layer;

further including:

discarding or replacing at least part of the image information of the medical image (10) which does not depict the identified body region (14);

wherein at least portions of at least two image segments of the said plurality of image segments (20) that include at least part of the depicted body region and which are used to train the machine learning model to detect similar irregularities overlap one another; and wherein an overlapping portion of the said at least two image segments (20) includes at least part of the depicted irregularity (12).

2. The method according to claim 1, wherein the machine learning model comprises a neural network.

3. The method according to claim 1, wherein the neural network uses the image information of medical images (10) at an input layer and/or provides the detected irregularity at an output layer.

4. The method according to claim 1, wherein the image segments (20) are defined so that the depicted irregularity (12) is included in at least one image segment (20) as a whole.

5. The method according to claim 1, wherein the body region (14) is the lungs.

6. The method according to claim 5, wherein each left and right lung (11, 13) is segmented by means of the at least two image segments (20).

7. The method according to claim 6, wherein an image segment (20) does not include more than one lung (11, 13).

8. The method according to claim 7, wherein at least one further depicted body region (40) is identified in the medical image (10), at least one further image segment of the said plurality of image segments (20) is defined that includes said further depicted body region (40) and said further image segment (20) is also used for training the machine learning model.

9. The method according to claim 8, wherein the further depicted body region (40) is the heart or a region in which the heart overlaps with the lungs.

10. The method according to claim 5, wherein an image segment (20) does not include more than one lung (11, 13).

11. The method according to claim 1, wherein at least one further depicted body region (40) is identified in the medical image (10), at least one further image segment of said plurality of image segments (20) is defined that includes said further depicted body region (40) and said further image segment (20) is also used for training the machine learning model.

12. The method according to claim 11, wherein the further depicted body region (40) is the heart or a region in which the heart overlaps with the lungs.

13. Use of a machine learning model for detecting an irregularity in a medical image, wherein the machine learning model has been trained by means of a method according to one of the previous claims.

14. A system (1) for detecting irregularities in medical images (10), the system including at least one computer device (2), the computer device (2) being configured to detect irregularities (12) in medical images (10) by means of a machine learning model that has been trained by means of a method according to claim 1.

15. A system (1) for training a machine learning model for detecting irregularities (12) in medical images (10), the system (1) including at least one computer device (2) and being configured to:
- identify at least one predetermined type of body region (14) depicted in a medical image (10), said body region (14) having a depicted irregularity (12);
- define a plurality of different image segments (20) each including at least part of the depicted body region (14), wherein a resolution of the image segments (20) is not changed or not reduced by more than 20% compared to the medical image (10); and
- use said image segments (20) to train the machine learning model to detect similar irregularities (12) in other medical images (10);
- wherein the machine learning model comprises a neural network; wherein the neural network uses the image information of medical images (10) at an input layer and/or provides the detected irregularity at an output layer;
- the at least one computer device (2) and being further configured to:
- discard or replace at least part of the image information of the medical image (10) which does not depict the identified body region (14);
  - wherein at least portions of at least two image segments of the said plurality of different image segments (20) that each include at least part of the depicted body region and which are used to train the machine learning model to detect similar irregularities in other medical images overlap one another; and
  - wherein an overlapping portion of the said at least two image segments (20) includes at least part of the depicted irregularity (12).

\* \* \* \* \*